United States Patent [19]
Habuta et al.

[11] Patent Number: 5,895,056
[45] Date of Patent: Apr. 20, 1999

[54] METAL GASKET WITH SEAL MEMBERS AT AN AREA BETWEEN A MAIN SEAL PORTION AND A SUB-SEAL PORTION

[75] Inventors: Yoshinori Habuta; Kazukuni Takata; Hiroshi Uemura, all of Osaka, Japan

[73] Assignee: Nippon Gasket Co., LTD., Osaka-fu, Japan

[21] Appl. No.: 08/814,014

[22] Filed: Mar. 10, 1997

[30] Foreign Application Priority Data

Apr. 9, 1996 [JP] Japan .................................. 8-111103
Dec. 4, 1996 [JP] Japan .................................. 8-337717

[51] Int. Cl.⁶ .................................................. F16J 15/06
[52] U.S. Cl. ........................................ 277/598; 277/591
[58] Field of Search .................................. 277/591, 593,
277/598, 637, 640, FOR 235, 596, 630;
123/193.3, 193.5

[56] References Cited

U.S. PATENT DOCUMENTS

| | | | |
|---|---|---|---|
| 3,108,818 | 10/1963 | Furstenburg | 277/637 |
| 4,754,982 | 7/1988 | Udagawa et al. | 277/596 |
| 5,222,745 | 6/1993 | Akbar et al. | 277/598 X |
| 5,544,901 | 8/1996 | Kubouchi et al. | 277/591 |

FOREIGN PATENT DOCUMENTS

63-048059  4/1988  Japan .
3-027857  3/1991  Japan .
3-027858  3/1991  Japan .
8-074659  3/1996  Japan .

*Primary Examiner*—Eric K. Nicholson
*Assistant Examiner*—Greg Binda
*Attorney, Agent, or Firm*—Browdy and Neimark

[57] ABSTRACT

This metal gasket has firmly secured to the intermediate plate through the mounting metal plates the seal members for sealing stepped portions that occur between the cylinder block and the chain case. The metal gasket comprises elastic metal plates formed with notched portions opening to the chain passage opening and an intermediate plate formed with sealing slots, mounting holes and positioning holes. The seal members are installed in the sealing slots of the intermediate plate to seal the stepped portions between the main seal portion and the sub-seal portions. The mounting metal plates attached to the seal members are provided with engagement portions. The engagement portions are folded to hold the edges of the mounting holes to secure the mounting metal plates to the intermediate plate and position the seal members in the sealing slots. Alternatively, the intermediate plates are formed with slots in which to install the seal members, and the elastic metal plates and the intermediate plates are formed with notched portions in areas where the seal members are located. The metal plates securely attached to the seal members are folded to hold the mounting portions of the intermediate plates.

7 Claims, 5 Drawing Sheets

METAL GASKET WITH SEAL MEMBERS AT AN AREA BETWEEN A MAIN SEAL PORTION AND A SUB-SEAL PORTION

BACKGROUND OF THE INVENTION

1. Field of the Invention

The present invention relates to a metal gasket made of a thin metal plate, which has a main seal portion formed with a hole such as a combustion chamber hole and a sub-seal portion formed with an opening such as a chain passage opening, and which is intended to seal an interface between a cylinder block with a chain case and a cylinder head.

2. Description of the Prior Art

The metal gaskets have been used to seal hermetically between a top surface of an integrally formed cylinder-block-and-chain-case assembly and a bottom surface of a cylinder head and comprise a main seal portion requiring a high sealing surface pressure and a sub-seal portion requiring only a relatively low sealing surface pressure. The sub-seal portion has a laminated structure having a base member, which is formed by extending at least one of the thin metal plates forming the main seal portion, and soft sheets, such as a beater sheet, a graphite sheet and a compressed sheet, bonded to one or both surfaces of the base member (see Japanese Utility Model Laid-Open No. 48059/1988, for example).

Other known examples of the metal gasket include those of Japanese Utility Model Laid-Open No. 27857/1991 and 27858/1991. In the metal gasket disclosed in Japanese Utility Model Laid-Open No. 27857/1991, a part of the thin metal plate facing a stepped portion of the top surface of the cylinder block or of the bottom surface of the cylinder head is formed with slots that cross beads formed around the chain passage opening, and a sealing material is fitted in the slots at positions opposing the stepped portions so that a part of the sealing material projects from the slots.

With the OHC and DOHC type engines, however, as shown in FIG. 17, it is general practice to fabricate a chain case 29 accommodating a cam shaft drive chain separately from a cylinder block 28 and to fix by bolts the chain case 29-which has a chain case space, i.e. a chain passage opening 33-adjacent to the cylinder block 28 having a combustion chamber 35. Metal gaskets are interposed between the cylinder head and the chain case 29 and cylinder block 28, with the chain case 29 secured to the cylinder head by bolts inserted through bolt holes 32.

For a lighter engine, the mounting side of the chain case 29 is formed open to reduce the weight of the chain case 29 and the chain passage opening 33 is defined by the inner wall of the chain case 29 and the side wall of the cylinder block 28. Because separate components are combined and fixed, even when the upper surface 34 of the cylinder block 28 and the upper surface 31 of the chain case 29 are made flush, it is unavoidable that a stepped portion 30, though small, is formed between these upper surfaces 31 and 34 at the engagement surface 36 of the cylinder block 28 and the chain case 29. This stepped portion 30 will unavoidably increase over a long period of use of the engine. If there is a stepped portion 30 between the two upper surfaces 31 and 34, lubricant, splashed onto the stepped portion 30 as the cam shaft drive chain travels through the chain case 29, may leak outside the chain case 29 or enter between the opposing surfaces of the cylinder block 28 and the cylinder head, causing troubles.

In a structure, in which a thin metal plate laminated on the cylinder block 28 side is extended as a base member, to one surface of which a soft sheet is bonded, airtightness at the stepped portion 30 cannot be maintained. Further, in a structure in which an intermediate thin metal plate is extended as a base member, to both surfaces of which soft sheets are bonded, although the airtightness can be maintained when the stepped portion 30 is very small, it is necessary, as the stepped portion 30 increases, to consider the thickness of the soft sheet in the main seal portion in designing the metal plate lamination because the soft sheet itself must be thick enough to maintain the sealing performance The beater sheet, graphite sheet or compressed sheet that forms a soft sheet generally has a thickness of at least about 0.5 mm, and because the main seal portion needs to match this thickness, it is necessary to increase the number of laminated thin metal plates to secure a high surface pressure at the main seal portion.

Further, the metal gasket has slots formed along the circumference of a through-hole, and a sealing material is installed inside the slots so that a part of the sealing material projects from the slots. The sealing capability of portions around the through-hole that oppose the stepped portions is maintained by the seal member installed inside the slots. The sealing material extends along the entire circumference of the through hole and is not fitted into the intermediate sheet.

Generally there are two types of stepped portions formed at the engagement surface between the cylinder block and the chain case. When the upper surface of the chain case is lower than the upper surface of the cylinder block, the surface pressure of the chain case is lower than that of the cylinder block and it is necessary to consider the surface pressure of the stepped portion and the chain case. When the upper surface of the chain case is higher than the upper surface of the cylinder block, the surface pressure concentrates on the chain case making the surface pressure on the cylinder block side smaller. The surface pressure around the combustion chamber of the cylinder block needs to be set high but, when a metal gasket is used, adjustment of the surface pressure becomes difficult.

The undersurface of the cylinder head in general is a flat continuous surface whereas there may be a difference in height between the top surface of the cylinder block and the top surface of the chain case. Thus the metal gasket has a challenging task of preventing oil in the chain case from entering into a stepped portion formed when there is a difference in height between the top surfaces of the cylinder block and the chain case, without resorting to increasing the number of laminated thin metal plates, a means that will increase the manufacture cost of the gasket significantly.

The inventor of this invention developed a metal gasket disclosed in Japanese Patent Laid-Open No. 74659/1996, in which a seal member is arranged in a region of stepped portion. With this metal gasket, however, when arranging the seal member in the region of stepped portion, there is still an unsolved problem of how to fix the seal member to the metal gasket at a predetermined location stably and firmly so that it will not be dislocated.

SUMMARY OF THE INVENTION

The object of this invention is to solve the problems mentioned above and to provide a reliable, inexpensive metal gasket, which can reliably position seal members in areas of stepped portions that may occur at engagement surfaces between the cylinder block and the chain case to seal the opposing surfaces of the cylinder block and the cylinder head; which secures the sealing members to the intermediate plate easily and firmly to prevent the sealing members from coming off and thereby stably keep them in place; which prevents leakage of lubricating oil from the stepped portions by the sealing members and improves the sealing of areas around the engagement surfaces; and which allows easy adjustment of the surface pressure between the cylinder head and the cylinder block.

The present invention relates to a metal gasket to seal between opposing surfaces of a cylinder block mounted with a chain case through which a chain travels and of a cylinder head; which comprises: thin metal plates, each comprising a main seal portion having combustion chamber holes and sub-seal portions having a chain passage opening; seal members to seal stepped portions occurring at boundaries between the main seal portion and the sub-seal portions of the thin metal plates; and mounting metal plates attached to the seal members and having engagement portions; wherein the thin metal plates include elastic metal plates and an intermediate plate laminated between the elastic metal plates, the elastic metal plates having beads formed along at least the combustion chamber holes and the chain passage opening; wherein the seal members are arranged in sealing slots of the intermediate plate corresponding to notched portions of the elastic metal plates; wherein the engagement portions of the mounting metal plates are folded to hold edge portions of mounting holes in the intermediate plate to securely fix the mounting plates to the intermediate plate.

Further, the notched portions of the elastic metal plates are so formed as to open to the chain passage opening. The mounting holes of the intermediate plate are formed on the chain passage opening side of the sealing slots at least at two locations along the sealing slot. Further, a positioning hole for mounting the mounting metal plates to the intermediate plate is formed between the mounting holes formed in the intermediate plate and at a location corresponding to a positioning hole provided to the mounting plate.

The mounting metal plates are securely fitted partly into the seal members. The mounting metal plates are placed in contact with the intermediate plate between the mounting holes formed in the intermediate plate, and the engagement portions project from both sides of the mounting metal plates and are folded to hold edges of the mounting holes so that the engagement portions are removably secured to the mounting holes of the intermediate plate.

Because of the construction described above, this metal gasket can reliably and correctly position the seal members in areas of the engagement surfaces in ways that prevent them from being dislocated. If there are stepped portions at the engagement surfaces between the chain case and the cylinder block, the seal members directly contact the stepped portions absorbing the height differences. Even when the stepped portions are relatively large, the bead around the chain passage opening and the seal members synergistically combine to absorb the height differences, providing a sufficient sealing performance and preventing oil leakage from within the chain case. Hence, the sealing reliability is enhanced.

The engagement portions of the mounting metal plates project from both sides thereof and are folded to hold the edges of the mounting holes and are thereby firmly secured to the mounting holes of the intermediate plate. In this way, the mounting metal plates are removably attached to the intermediate plate.

The secure mounting of the seal members to the intermediate plate can be realized simply by folding the engagement portions of the mounting metal plates, making the attaching and detaching very easy.

Provision of the engagement portions to the mounting metal plates makes the attaching and detaching of the mounting metal plates to the intermediate plate easy and secure, lowers the manufacture cost, and allows the sealing members to be positioned in the sealing slots of the intermediate plate easily and highly precisely, preventing positional deviations of the sealing members and improving the sealing performance.

In this metal gasket, the seal members situated in areas of the engagement surfaces between the chain case and the cylinder block have almost no effects on the combustion chamber and prevent leakage of hot and high-pressure combustion gases produced in the combustion chamber from between the opposing surfaces of the cylinder head and the cylinder block. The seal members also prevent leakage of liquids flowing inside water holes and oil holes from between the opposing surfaces. Tightened with high sealing surface pressure, the metal gasket reliably seals the opposing surfaces.

Therefore, the metal gasket of this invention can properly seal the areas of height difference at the engagement surfaces between the chain case and the cylinder block and prevent oil splashed in the chain case from leaking out through the engagement surfaces and being sprayed outside during the running of the chain.

If the height difference at the engagement surfaces between the cylinder block and the cylinder head becomes large lowering the sealing surface pressure, the thickness of the seal members can be adjusted to offer a satisfactory sealing performance in the height difference areas.

The elastic metal plates are arranged at least on the cylinder head side and comprise one or two elastic metal plates The number of elastic metal plates and the intermediate plates needs to be chosen properly according to the thickness required of the main seal portion and the sub-seal portion. For example, when the main seal portion and the sub-seal portion are formed by using two elastic metal plates and two intermediate plates, a good sealing performance can be achieved by adjusting the tightening force of the bolts in the main seal portion and the sub-seal portion.

Alternatively, in a metal gasket applied where the chain case projects higher than the cylinder block, a good sealing performance can be realized by using two elastic metal plates and two intermediate plates for the main seal portion and one elastic metal plate and two intermediate plates for the sub-seal portion, i.e., by making the sub-seal portion one plate fewer than the main seal portion.

The present invention also relates to a metal gasket, in which the thin metal plates forming the main seal portion and the sub-seal portions include elastic metal plates and intermediate plates; in which the elastic metal plates are formed with a half bead along the chain passage opening; in which the elastic metal plates and the intermediate plates have notched portions formed in an area of the sub-seal portion close to the main seal portion to accommodate the seal members secured to the intermediate plates and thereby to seal the stepped portions occurring at boundaries between the main seal portion and the sub-seal portions; and in which metal plates are attached to the seal members to secure the seal members to the intermediate plates.

The notched portions formed in the elastic metal plates are cut on the chain passage opening side. The notched portions formed in the intermediate plates are formed into holes in which to fit the sealing members, and the intermediate plates are formed with mounting portions on the chain passage opening side of the seal member installation holes.

The metal plates fitted into the seal members have folded a portion thereof which extends from the seal members toward the chain passage opening side to hold the mounting portions of the intermediate plates to secure the metal plates to the intermediate plates.

Further, a thickness of the portion where the metal plates are folded to hold the mounting portions of the intermediate plates is smaller than a total thickness of the first and second elastic metal plates and intermediate plates.

In this metal gasket, because the metal plate secured to the sealing member is folded to hold the mounting portion of the intermediate plate to fix the seal member to the intermediate plate, it is possible to position the seal members close to the areas of height difference and prevent the sealing members from being disclosed.

If there are stepped portions at the engagement surfaces between the chain case and the cylinder block, the seal members directly contact the stepped portions absorbing the height differences. Even when the stepped portions are relatively large, the bead and the seal members combine to absorb the height differences, preventing oil leakage from within the chain case and offering a secure sealing. Hence, the sealing performance and reliability are improved. Furthermore, the seal members can be firmly fixed to the intermediate plates simply by folding the metal plates, making attaching and detaching of the seal members very easy.

BRIEF DESCRIPTION OF THE DRAWINGS

FIG. 11 is an enlarged plan view of a portion F in FIG. 10;

FIG. 12 is a cross section taken along the line G—G of FIG. 10;

FIG. 13 is a cross section taken along the line H—H of FIG. 10;

FIG. 14 is a cross section taken along the line I—I of FIG. 10;

FIG. 15 is a cross section taken along the line J—J of FIG. 10;

FIG. 16 is a cross section showing thin metal plates of the metal gasket of FIG. 10.

DETAILED DESCRIPTION OF THE EMBODIMENTS

The metal gasket of this invention will be described by referring to the accompanying drawings. A first embodiment of the gasket according to this invention is explained by referring to FIGS. 1 to 9 and FIG. 17.

This metal gasket is, as shown in FIG. 17, intended to seal the interface between the cylinder head (not shown) and the cylinder block 28 and chain case 29. The chain case 29 is fabricated as a separate component independent of the cylinder block 28 and mounted to the side wall of the cylinder block 28. For reduced weight, the chain case 29 is formed open on the cylinder block 28 mounting side. The chain case 29 is U-shaped in horizontal cross section and has at two locations an interface surface or engagement surface 36 in contact with the cylinder block 28. A hollow portion 33 through which a chain for driving a cam shaft travels is formed by the inner wall of the chain case 29 and the side wall of the cylinder block 28.

In this metal gasket, elastic metal plates 5, 7 and an intermediate plate 6, made of thin metal plates, are formed with a combustion chamber hole 3 corresponding to the combustion chamber 35 of the cylinder block 28 and with a chain passage opening 4 corresponding to the hollow portion 33 of the chain case 29.

In this embodiment, a sub-seal portion 2 is made by extending the thin metal plates-elastic metal plates 5, 7 and an intermediate plate 6 that make up a main seal portion 1-over the chain passage opening 4 of the chain case. The main seal portion 1 and the sub-seal portion 2 have the same number of thin metal plates. The sealing characteristics of the main seal portion 1 on the combustion chamber side and of the sub-seal portion 2 on the chain case side are properly adjusted by differentiating the fastening forces of the bolts between the main seal portion 1 side and the sub-seal portion 2 side.

Figure 7:
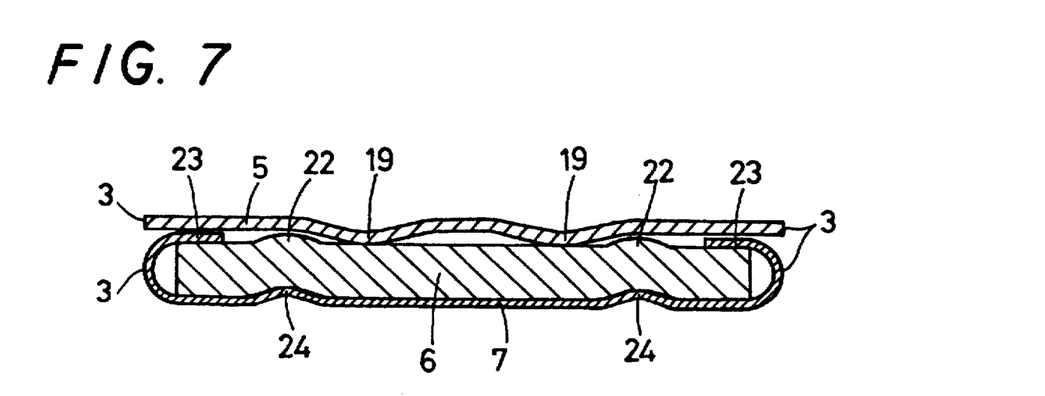
FIG. 7 is a cross section taken along the line D—D of FIG. 1.
Figure 8:
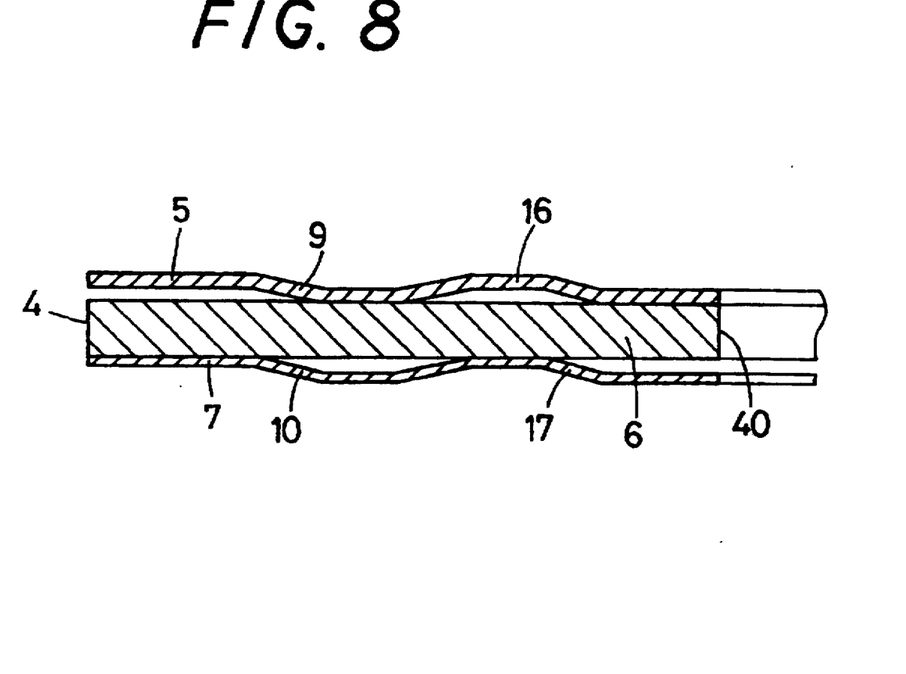
FIG. 8 is a cross section taken along the line E—E of FIG. 1.

As shown in FIG. 7, the elastic metal plate 5 in the main seal portion 1 is formed with beads 19, V-shaped in cross section, each of which is concentric with and circles around the combustion chamber hole 3 at a location slightly removed in a radial direction from the inner edge of the combustion chamber hole 3. The intermediate plate 6 making up the main seal portion 1 is similarly formed with beads 22, each of which is concentric with and circles around the combustion chamber hole 3 to provide a stopper function for preventing a total compression of the bead 19. The elastic metal plate 7 has folded portions 23 for holding the intermediate plate 6 at the circumferences of the combustion chamber holes 3 and auxiliary beads 24 formed at locations corresponding to the beads 22 of the intermediate plate 6 to supplement the beads 22.

As described above, this metal gasket comprises the main seal portion 1 and the sub-seal portion 2, the latter having thin metal plates extended from a part of the thin metal plates of the main seal portion 1. The main seal portion 1 is interposed between the upper surface 34 of the cylinder block 28 and the lower surface of the cylinder head to seal the circumferences of various holes, such as combustion chamber holes 3, bolt holes 37, oil holes 38, water holes 39 and knock holes 40, formed around the engine cylinders or combustion chambers 35. The sub-seal portion 2 seals two opposing surfaces. One of the opposing surfaces sealed by the sub-seal portion 2 is the upper surface 31 of the chain case 29 forming the hollow portion 33 and the upper surface 34 of the side portion of the cylinder block 28, as shown in FIG. 17. The second opposing surface is an area of the undersurface of the cylinder head which opposes the area of the first surface and is continuously planar as is one of the opposing surfaces of the main seal portion 1. In this embodiment, the main seal portion 1 and the sub-seal portion 2 are formed integral and contiguous In the sub-seal portion 2, the elastic metal plates 5, 7 are formed with half beads or beads 9, 10 along the chain passage opening 4 of the chain case, as in the main seal portion 1.

This metal gasket is designed to seal between the opposing surfaces of the cylinder block mounted with the chain case and of the cylinder head, and has a construction in which a plurality of thin metal plates with the combustion chamber holes 3 are stacked together to form the main seal portion 1 and the sub-seal portion 20 The thin metal plates of the metal gasket are elastic metal plates 5 and 7 arranged on both sides and an intermediate plate 6 interposed between the two elastic metal plates 5, 7. The elastic metal plate 5 forms a bead plate arranged on the cylinder head side, the elastic metal plate 7 forms a stopper plate arranged on the cylinder block 28 side, and the intermediate plate 6 forms an adjust plate for adjusting the tightening thickness. While this embodiment employs a single intermediate plate 6, two intermediate plates 6 may be used. When the metal gasket is interposed between the opposing surfaces of the cylinder head and the cylinder block 28 and then tightened, the beads 19 provided in the elastic metal plates 5, 7 near the circumferences of the combustion chamber holes 3 contact the cylinder head bottom surface around the combustion chamber holes 3, forming annular sealing portions.

The elastic metal plate 5 is formed with the half beads 9 around the chain passage opening 4 for the hollow portion 33 of the chain case 29 through which the cam shaft drive chain travels. Similarly, the elastic metal plate 7 is formed with beads 10 around the chain passage opening 4 for the hollow portion 33. To seal the stepped portion 30 that may occur at the boundary between the chain case 29 and the cylinder block 28, i e., at the engagement surface 36, the intermediate plate 6 is formed with a rectangular slot 13 in an area of the sub-seal portion 2 close to the main seal portion 1, the rectangular slot forming a notched portion in which a seal member 25 is fitted. The rectangular slot 13 extends perpendicularly from the engagement surface 36 toward the chain case 29. In the main seal portion 1, the elastic metal plates 5, 7 are formed with half beads or beads 16, 17 along the circumferences thereof.

This metal gasket is characterized in the structure in which the seal member 25 to seal the stepped portion 30 that may form at the boundary of the engagement surface 36 between the main seal portion 1 and the sub-seal portion 2 is secured to the intermediate plate 6. To fit the seal member 25 to the intermediate plate 6, one end portion of a mounting metal plate 15 is inserted into an engagement hole 41 formed in an intermediate part of the seal member 25. The seal member 25 is fixed with the mounting metal plate 15 which is partly inserted into the engagement hole 41 of the seal member 25.

The elastic metal plates 5, 7 are formed with notched portions 11, 12 that are open on the chain passage opening 4 side. The intermediate plate 6 is formed with the rectangular sealing slot 13 in which to install the seal member 25 in positions corresponding to the notched portions 11, 12 of the elastic metal plates 5, 7. The seal member 25 is attached to the mounting metal plate 15 having engagement portions 8.

Figure 1:
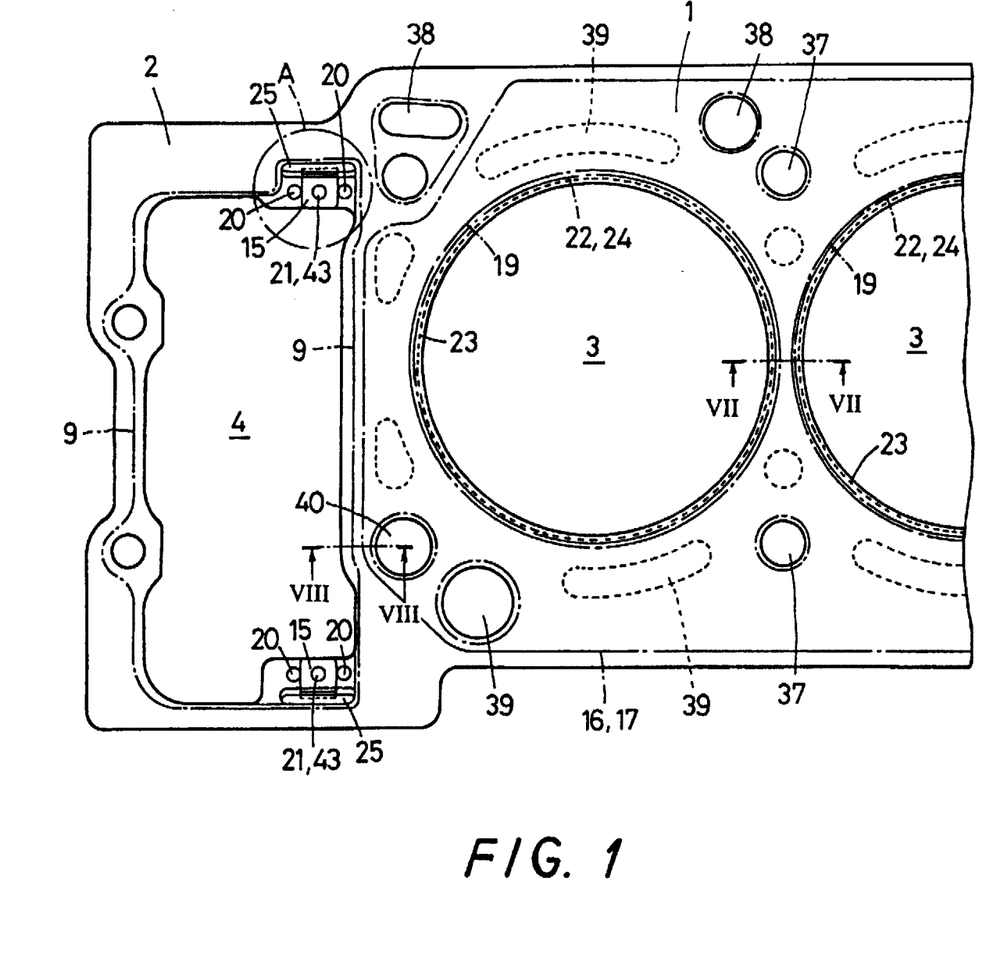
FIG. 1 is a partial plan view of a first embodiment of the metal gasket of this invention.
Figure 2:
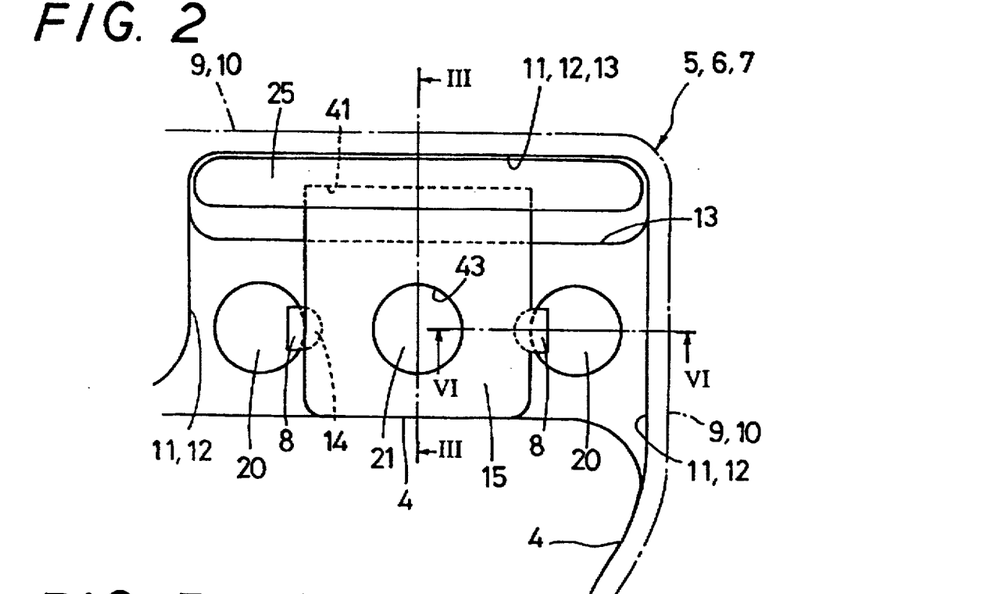
FIG. 2 is an enlarged plan view of a portion A in FIG. 1.
Figure 3:
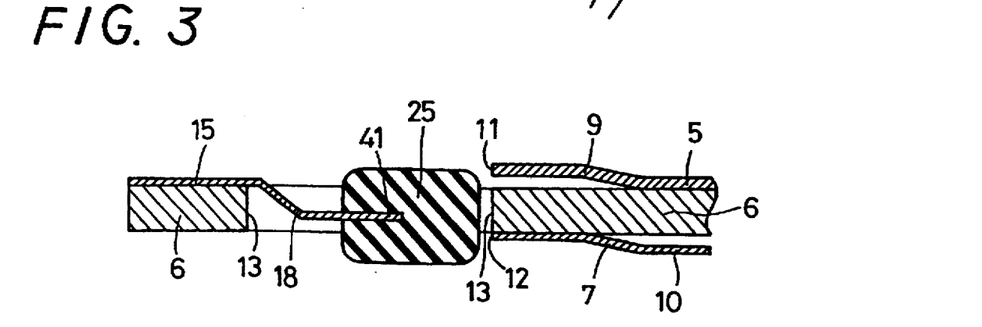
FIG. 3 is a cross section taken along the line B—B of FIG. 2.
Figure 4:
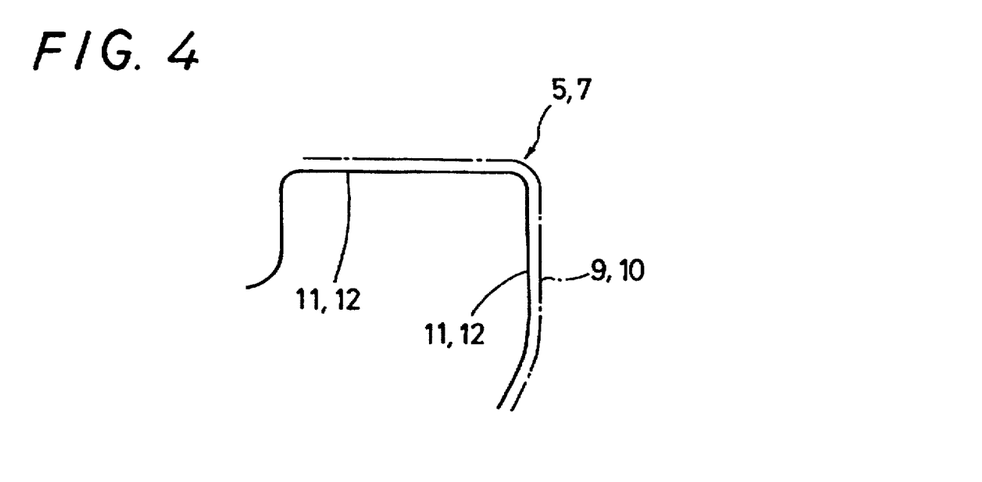
FIG. 4 is an enlarged plan view of an elastic metal plate of the portion A in FIG. 1.
Figure 5:
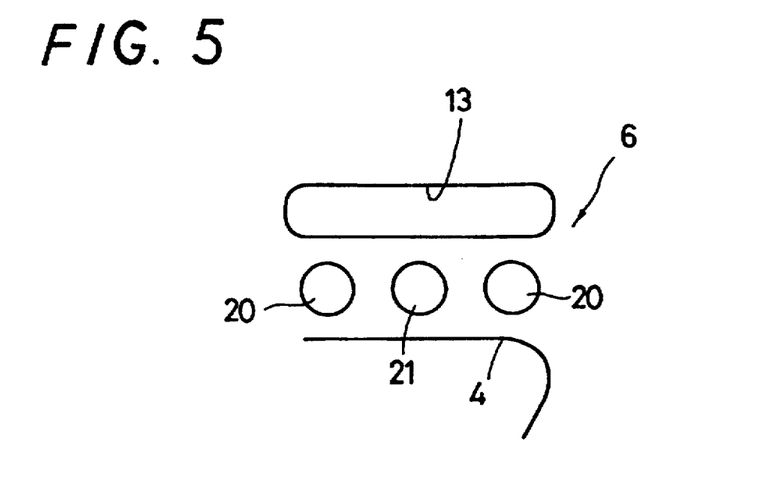
FIG. 5 is an enlarged plan view of an intermediate plate of the portion A in FIG. 1.
Figure 6:
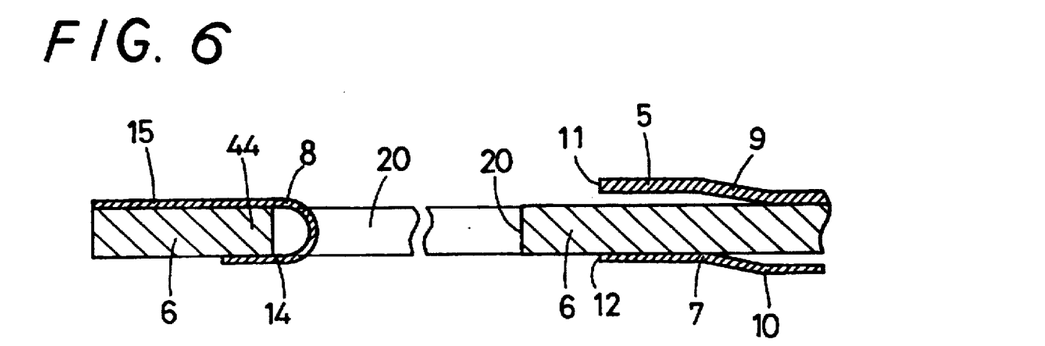
FIG. 6 is a cross section taken along the line C—C of FIG. 2.

A part of the mounting metal plate 15 that extends from the seal member 25 positioned in the sealing slot 13 through a bent portion 18 toward the chain passage opening 4 is placed on the top surface of the intermediate plate 6. The engagement portions 8 of the mounting metal plate 15 are folded to enclose the edges 14 of the mounting holes 20 of the intermediate plate 6, as shown in FIG. 6, so that the mounting metal plate 15 is secured to the intermediate plate 6 and the seal member 25 is positioned in the sealing slot 13.

The mounting holes 20 in the intermediate plate 6 are located on the chain passage opening 4 side of the sealing slot 13 and are formed at least at two locations along the sealing slot 13. Between the mounting holes 20 of the intermediate plate 6 is formed a positioning hole 21 to mount the mounting metal plate 15 to the intermediate plate 6. The positioning hole 21 is located at a position corresponding to a positioning holes 43 formed in the mounting metal plate 15. The mounting metal plate 15 is placed in contact with the intermediate plate 6 between the mounting holes 20 of the intermediate plate 6, with the positioning holes 21 and 43 matched or aligned. The mounting metal plate 15 has the engagement portions 8 projecting from the sides which are folded to hold the edge portions 44 of the mounting holes 20 so that the mounting metal plate 15 is removably secured to the intermediate plate 6 firmly and easily.

Hence, with this metal gasket, the seal member 25 is removably secured to the mounting holes 20 of the intermediate plate 6 securely and easily by the engagement portions 8 clamping the mounting holes 20 so that it is prevented from coming off the rectangular sealing slot 13 and is firmly secured to the intermediate plate 6. The seal member 25 is made of a nonmetallic material, such as heat resistant resin and silicone rubber, and formed into a bar member rectangular in cross section so that it can easily fit into the rectangular slot 13 of the intermediate plate 6. The seal member 25 may be formed circular in cross section and its shape is not limited to that of this embodiment.

The metal gasket must meet the following conditions in terms of its thickness. That is, two times the thickness of the mounting metal plate 15 must not be greater than the total thickness of the elastic metal plate 5 and the elastic metal plate 7. If this condition is satisfied, it is possible to use only one elastic metal plate and, in that case, the elastic metal plate 5 on the cylinder head side is used. In other words, the thickness of the portion where the engagement portions 8 of the mounting metal plate 15 are folded to hold the edge portions 44 of the mounting holes 20 of the intermediate plate 6 is set smaller than the total thickness of the elastic metal plate 5, the elastic metal plate 7 and the intermediate plate 6. It is also necessary that the thickness of the seal member 25 be greater than the total thickness of the three plates, the elastic metal plates 5, 7 and the intermediate plate 6. Further, to allow the seal member 25 to deform properly by the pressing force produced when the metal gasket is tightened between the chain case and the cylinder head, it is required that a clearance be provided, as the deformation margin for the seal member 25, between the circumferential wall surface of the sealing slot 13 of the intermediate plate 6 and the outer circumferential surface of the seal member 25. With the seal member 25 set in the above-mentioned size, the stepped portion 30 formed at the engagement surface 36 can be sufficiently offset to provide an improved sealing performance.

In laminating the thin metal plates, to allow the metal gasket to deform and follow the cylinder head, which is more easily deformed than the cylinder block 28, the elastic metal plates 5, 7 situated on the cylinder head side use materials with good machinability. The elastic metal plates 5, 7, for example, are made from SUS301 with hardness of HV 300–500 and thickness of 0.2–0.3 mm. The elastic metal plate 7 may be fabricated from SUS304 or SUS430 with hardness of HV 150–200, as required. The intermediate plate 6 uses SUS430 or SPC with hardness of HV 150–200. The mounting metal plate 15 for mounting the seal member 25 to the intermediate plate 6 is made from SUS430 or SPC.

Figure 9:
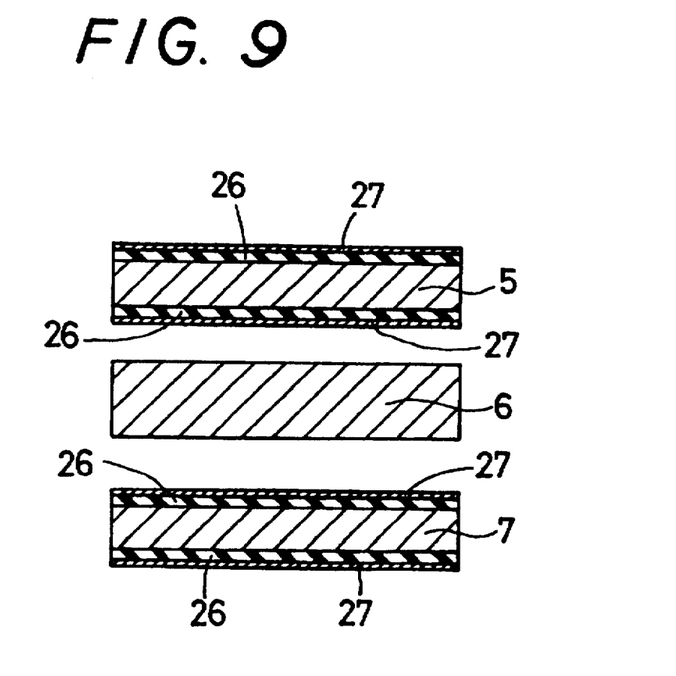
FIG. 9 is a cross section showing thin metal plates of the metal gasket of FIG. 1.
Figure 10:
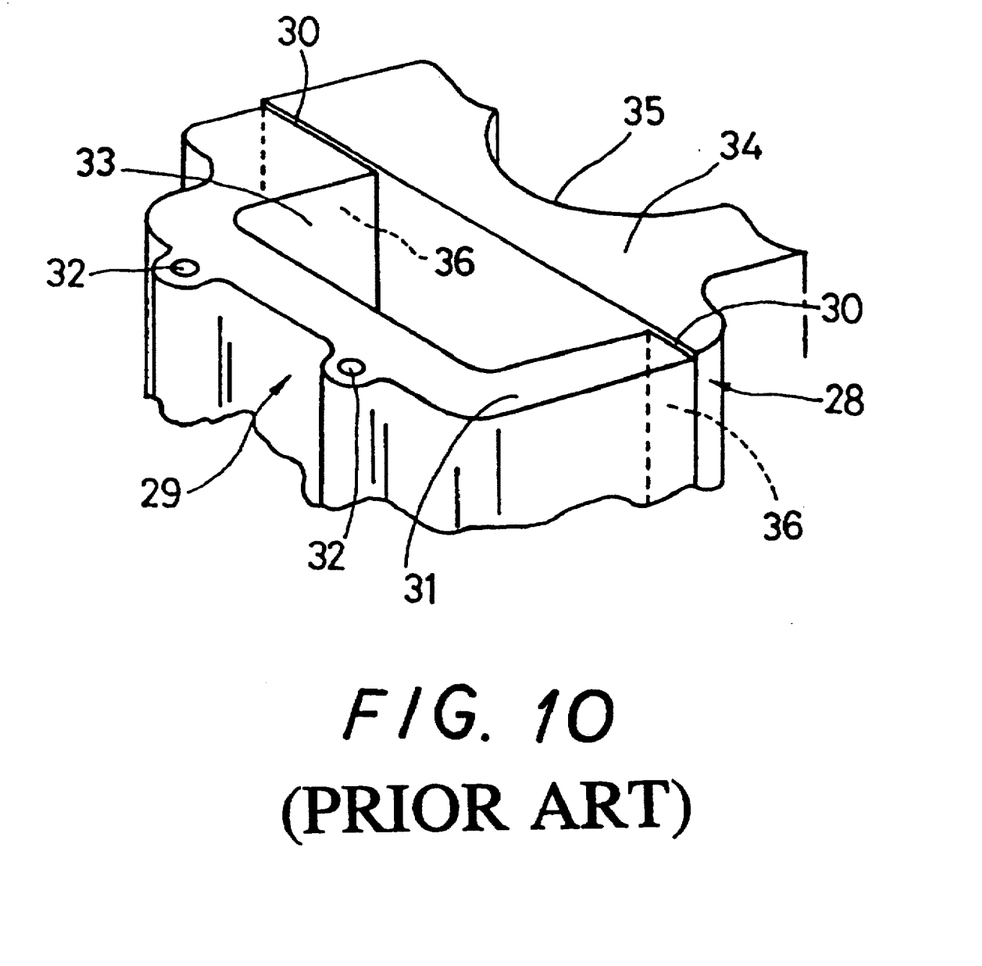
FIG. 10 is a perspective view showing a cylinder block with a chain case.

Further, as shown in FIG. 9, this metal gasket has its thin metal plates heat-treated and coated on both sides. For example, the elastic metal plate 5 is coated with fluororubber 26 and acrylic silicone 27, both nonmetallic materials, and the elastic metal plate 7 is coated with fluororubber 26 and acrylic silicone 27, to avoid a metal-to-metal contact between the elastic metal plates 5, 7 and the intermediate plate 6, between the elastic metal plate 5 and the cylinder head, and between the elastic metal plate 7 and the cylinder block. This provides the metal gasket with necessary corrosion resistance, durability and strength. The intermediate plate 6 may be coated with fluororubber and acrylic silicone, as required, without coating the nonmetallic materials to the surfaces of the elastic metal plates 5, 7 in contact with the intermediate plate 6. Coating the thin metal plates with nonmetallic materials as mentioned above allows uneven machined surfaces of the metal gasket to be covered and smoothed out by the nonmetallic materials, improving the sealing performance.

Next, by referring to FIGS. 10 to 16, a second embodiment of the metal gasket of this invention will be described.

What is claimed is:

1. A metal gasket to seal between opposing surfaces of a cylinder block mounted with a chain case through which a chain travels and of a cylinder head secured to the cylinder block, comprising:

thin metal plates, each comprising a main seal portion having combustion chamber holes and sub-seal portions each having a chain passage opening;

seal members to seal stepped portions occurring at boundaries between the main seal portion and the sub-seal portions of the thin metal plates; and mounting metal plates attached to the seal members and having engagement portions;

wherein the thin metal plates includes elastic metal plates and an intermediate plate laminated between the elastic metal plates, the elastic metal plates having beads formed along at least the combustion chamber holes and the chain passage opening;

wherein the seal members are arranged in sealing slots of the intermediate plate corresponding to notched portions of the elastic metal plates;

wherein the engagement portions of the mounting metal plates are folded to hold edge portions of mounting holes in the intermediate plate to securely fix the mounting plates to the intermediate plate.

2. A metal gasket according to claim 1, wherein at least one of the elastic metal plates is arranged on the cylinder head side.

3. A metal gasket according to claim 1, wherein the notched portions of the elastic metal plates are so formed as to open to the chain passage opening.

4. A metal gasket according to claim 1, wherein the mounting holes of the intermediate plate are formed on the chain passage opening side of the sealing slots at least at two locations along the sealing slot.

5. A metal gasket according to claim 4, wherein a positioning hole for mounting the mounting metal plates to the intermediate plate is formed between the mounting holes formed in the intermediate plate and at a location corresponding to a positioning hole provided to the mounting plate.

6. A metal gasket according to claim 1, wherein the mounting metal plates are securely fitted partly into the seal members.

7. A metal gasket according to claim 1, wherein the mounting metal plates are placed in contact with the intermediate plate between the mounting holes formed in the intermediate plate, and the engagement portions project from both sides of the mounting metal plates and are folded to hold edges of the mounting holes so that the engagement portions are removably secured to the mounting holes of the intermediate plate.

* * * * *